(12) United States Patent
Anderson et al.

(10) Patent No.: US 10,717,026 B1
(45) Date of Patent: Jul. 21, 2020

(54) WELL PRODUCTION SEPARATION SYSTEMS AND METHODS

(71) Applicant: COVENANT TESTING TECHNOLOGIES, LLC, Sugar Land, TX (US)

(72) Inventors: Paul Anderson, Houston, TX (US); Michael W. Joacim, Tomball, TX (US)

(73) Assignee: Covenant Testing Technology, LLC, Sugarland, TX (US)

( * ) Notice: Subject to any disclaimer, the term of this patent is extended or adjusted under 35 U.S.C. 154(b) by 0 days.

(21) Appl. No.: 16/804,250

(22) Filed: Feb. 28, 2020

Related U.S. Application Data

(60) Provisional application No. 62/812,046, filed on Feb. 28, 2019.

(51) Int. Cl.
| | | |
|---|---|---|
| *B01D 21/26* | (2006.01) | |
| *B04C 3/04* | (2006.01) | |
| *B01D 19/00* | (2006.01) | |
| *E21B 43/34* | (2006.01) | |

(52) U.S. Cl.
CPC ....... *B01D 21/267* (2013.01); *B01D 19/0057* (2013.01); *B04C 3/04* (2013.01); *E21B 43/34* (2013.01)

(58) Field of Classification Search
CPC .... B01D 21/267; B01D 19/0057; B04C 3/04; E21B 43/34
See application file for complete search history.

(56) References Cited

U.S. PATENT DOCUMENTS

| | | | | |
|---|---|---|---|---|
| 2,489,903 | A | * | 11/1949 | Kraft .................. B01D 3/06 55/355 |
| 3,235,090 | A | * | 2/1966 | Bose .................. B01D 21/2488 210/512.1 |
| 3,443,368 | A | * | 5/1969 | Wilson .................. B04C 5/085 55/435 |
| 3,516,551 | A | | 6/1970 | Wallen et al. |
| 3,764,008 | A | | 10/1973 | Darley et al. |
| 4,187,088 | A | | 2/1980 | Hodgson |
| 4,238,210 | A | | 12/1980 | Regehr et al. |
| 4,519,848 | A | | 5/1985 | Underwood |
| 5,635,068 | A | | 6/1997 | Marandi |
| 5,961,700 | A | | 10/1999 | Oliver |
| 6,119,870 | A | | 9/2000 | Maciejewski |
| 7,147,788 | B2 | | 12/2006 | Tveten |
| 7,166,230 | B2 | | 1/2007 | Nilsen |
| 7,569,098 | B2 | | 8/2009 | Oglesby |
| 7,708,808 | B1 | | 5/2010 | Heumann |
| 7,785,400 | B1 | | 8/2010 | Worley |
| 8,252,179 | B2 | | 8/2012 | Aoki |
| 8,313,565 | B2 | | 11/2012 | Sarshar et al. |

(Continued)

OTHER PUBLICATIONS

Fred Mueller, Fundamentals of Gas Solids/Liquids Separation, 2004, www.muellerenvironmental.com.

(Continued)

*Primary Examiner* — Liam Royce
(74) *Attorney, Agent, or Firm* — McAughan Deaver, PLLC

(57) ABSTRACT

A well production separation system comprising a cyclonic separator coupled to a spherical separator and configured to separate particulate matter from well production, and to recycle liquids and gases separated in the spherical separator to the overflow region of the cyclonic separator.

20 Claims, 16 Drawing Sheets

(56) References Cited

U.S. PATENT DOCUMENTS

| | | |
|---|---|---|
| 9,089,792 B2 | 7/2015 | Zylla |
| 9,821,257 B2 | 11/2017 | Arefjord |
| 2005/0224426 A1 | 10/2005 | Arefjord |
| 2014/0352538 A1 | 12/2014 | Larnholm |
| 2016/0030861 A1 | 2/2016 | Janssen et al. |
| 2016/0375386 A1* | 12/2016 | Magnus ................ B01D 45/08 95/267 |
| 2018/0099871 A1 | 4/2018 | Tanner et al. |
| 2018/0353975 A1 | 12/2018 | Spiridonov et al. |

OTHER PUBLICATIONS

Enercorp Sand Solutions, Sand Hybrid: Screen + Cyclone, 2018, www.enercoprsandsolutions.com.

* cited by examiner

WELL PRODUCTION SEPARATION SYSTEMS AND METHODS

CROSS REFERENCE TO RELATED APPLICATIONS

This application is a non-provisional of U.S. Patent Application No. 62/812,046, filed on Feb. 28, 2019, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable

BACKGROUND OF THE INVENTION

Field of the Invention

The inventions disclosed and taught herein generally relate to systems for separating a multi-component flow into one or more of its components; and more specifically relate to separating sand and other particulates from subterranean well production.

Description of the Related Art

Production from a subterranean well is typically a combination of solids, water (typically brine), and liquid and gaseous hydrocarbons. The solids or particulates typically are parts of the formation from which the hydrocarbon is being produced, particulates introduced into the well by hydraulic fracturing, and/or produced by a phase change of hydrocarbons (asphalt or wax formation). Particulate flow from the well may cause problems through abrasion or plugging of production equipment. Stimulated wells have been known to produce sand for a month or more after production begins.

The industry has developed equipment intended to separate well production into one or more of its constituent parts, including sand knock out equipment, desanders, and separating tanks. For example, U.S. Pat. No. 7,147,788 is entitled Separating a Hydrocarbon Production Stream into its Oil, Water and Particle Constituents and discusses "A separation method and apparatus are disclosed having particular application for effecting removal of sand from a production wellstream, enhancing the quality of recovered oil, gas and water output streams (12, 13, 14) and reducing erosion caused by entrained sand. The wellstream is passed initially through a cyclone separator (4') which separates substantially all the water and sand as underflow and substantially all the oil and gas as overflow. A gravity separator (11) separates the overflow from the cyclone separator (4') into oil, gas and water, and a further cyclone separator (17) separates the underflow from the first cyclone separator (4') into water and sand."

U.S. Pat. No. 8,252,179 is entitled Solid-Liquid Separator and discusses "A liquid cyclone is configured for inflowing raw water containing impurities as targets of collection to be forced to swirl inside to spin down impurities contained in raw water, an inflow pipe is connected with an upper portion of the liquid cyclone to supply the liquid cyclone with raw water, and configured for supplied raw water to be forced to swirl inside the liquid cyclone, a connecting portion is connected with a lower portion of the liquid cyclone, and configured with a discharge port to discharge spun down impurities from the liquid cyclone, an impurity collector is connected to the liquid cyclone with the connecting portion in between, and configured to collect impurities discharged from the liquid cyclone, an obstacle is disposed in or near the discharge port, and configured to prevent impurities collected in the impurity collector from backing up into the liquid cyclone, and an outflow pipe is connected with a top portion of the liquid cyclone, and configured for raw water having got rid of impurities to outflow as treated water from the liquid cyclone, whereby impurities separated from raw water is prevented from being re-mixed in raw water, allowing for an enhanced separation performance."

U.S. Pat. No. 9,821,257 is entitled Dynamic Particle Separator and discusses "A dynamic particle separator is described for cyclone separation of sand from a gas stream in connection with petroleum related production of oil and gas, where the separator comprises a housing (14) containing as cyclone tank (4) that is equipped with an upper inlet opening (1) for the gas stream and an upper and a lower outlet opening (2,12) for export of gas and particles, respectively, from the tank (4). The cyclone tank (4) is formed, at least in an internal area around the inlet opening (1), with an upper and downwardly directed conical shape (4 a) that increases in diameter, and where the upper conical shape (4 a) thereafter has a transition into an inverse, lower conical shape (4 b) that converges towards the lower outlet opening (12)."

U.S. Patent Application Publication No. 2014/0352538 is entitled Spherical Separation Device and Method for Separation and discusses "The present invention relates to an apparatus for separation of high volume flows of mixtures provided with at least two immiscible phases, especially for the first separation steps of flows of water/oil/gas/sand mixture that enter the apparatus as a wellstream mixture. The invention also relates to a method for separation of high volume flows of mixtures provided with at least immiscible phases."

The inventions disclosed and taught herein are directed to improved well production separation systems and methods of use.

BRIEF SUMMARY OF THE INVENTION

As a brief, non-limiting summary of one of many possible embodiments of the present inventions, a well production separation system may comprise a first separating vessel disposed above a second separating vessel. The first separating vessel may have a well production inlet, a removable cyclone module, an upper outlet, and a lower outlet coupled to the second separating vessel. The removable cyclone module may comprise at least one cyclonic separator configured to separate at least a portion of particulate matter from the well production and to discharge such matter from the lower outlet, and to separate at least a portion of the liquid and gases in the well production and discharge such fluid from the upper outlet. The second separating vessel may comprise a spherical inner surface with an inlet disposed on a top portion of the vessel, and an outlet disposed on a bottom portion of the vessel. A swirl inducer may have an outer convex surface and an inner concave surface, and may be disposed within the second vessel below the inlet and may comprise rotation inducing vanes on the outer surface configured to induce rotation of the matter that impacts the outer surface, the inner convex surface may be configured to collect liquid and/or gas within the second vessel. A fluid conduit may be configured to communicate from the second vessel to the upper outlet in the first vessel.

The system may comprise further a first chamber located in the first separating vessel above the cyclone module and below the upper outlet. The system may comprise further a first pressure sensor configured to transduce a pressure in the first chamber. The system may comprise further a second chamber located in the first separating vessel below the cyclone module. The system may comprise further a first pressure sensor configured to transduce a pressure in the first chamber, and a second pressure sensor configured to transduce a pressure in the second chamber. The system may comprise further a differential pressure sensor configured to transduce a differential pressure between the first and second chambers. The system may comprise further a first recycle conduit communicating between the first and second chambers and may be configured to communicate fluid from the second chamber to the first chamber. The system may comprise further one or more flow direction check valves in the recycle conduit. The system of claim 8, further comprising a second recycle conduit communicating between the fluid conduit and the first chamber. The system may comprise further an isolation valve disposed in the second recycle conduit. The system may comprise further a discharge valve in the second recycle conduit.

As another brief, non-limiting summary of another of the many possible embodiments of the present inventions, a method of separating production from a subterranean well into one or more components may comprise introducing production into a first vessel comprising a cyclone module having one or more cyclonic separators. Fluid may be extracted from the production by the cyclone module through an outlet in the first vessel above the cyclone module. Production components separated by the cyclone module may be discharged into a second vessel having a spherical interior surface. A swirl inducer may be located in an inlet portion of the second vessel and may contact the production components to induce rotation in the production components. A slurry containing particulates from the production components from the second may be discharged from the vessel. Fluid from a location under the swirl inducer and from a location below the cyclone module in the first vessel may be communicated to a chamber in the first vessel above the cyclone module and in communication with the outlet.

The method may comprise further sensing a pressure in the chamber. The method may comprise further sensing a pressure in the chamber, and sensing pressure in the first vessel below the cyclone module. The method may comprise further sensing a pressure in the chamber, sensing pressure in the first vessel below the cyclone module, and sensing pressure in the second vessel. The method may comprise further restricting flow of fluid to a direction into the first vessel above the cyclone module, but not out of the first vessel above the cyclone module. The method may comprise further preventing flow of fluid from the second vessel to the first vessel above the cyclone module. The method may comprise further extracting fluid from the second vessel when flow of fluid from the second vessel to the first vessel above the cyclone module is prevented. The method may comprise further determining an amount of slurry in the second vessel.

BRIEF DESCRIPTION OF THE SEVERAL VIEWS OF THE DRAWINGS

The following figures are included to demonstrate further specific aspects of the present inventions through certain non-limiting embodiments. The inventions may be better understood by reference to one or more of these figures in combination with the detailed description of specific embodiments presented herein.

Figure 1:
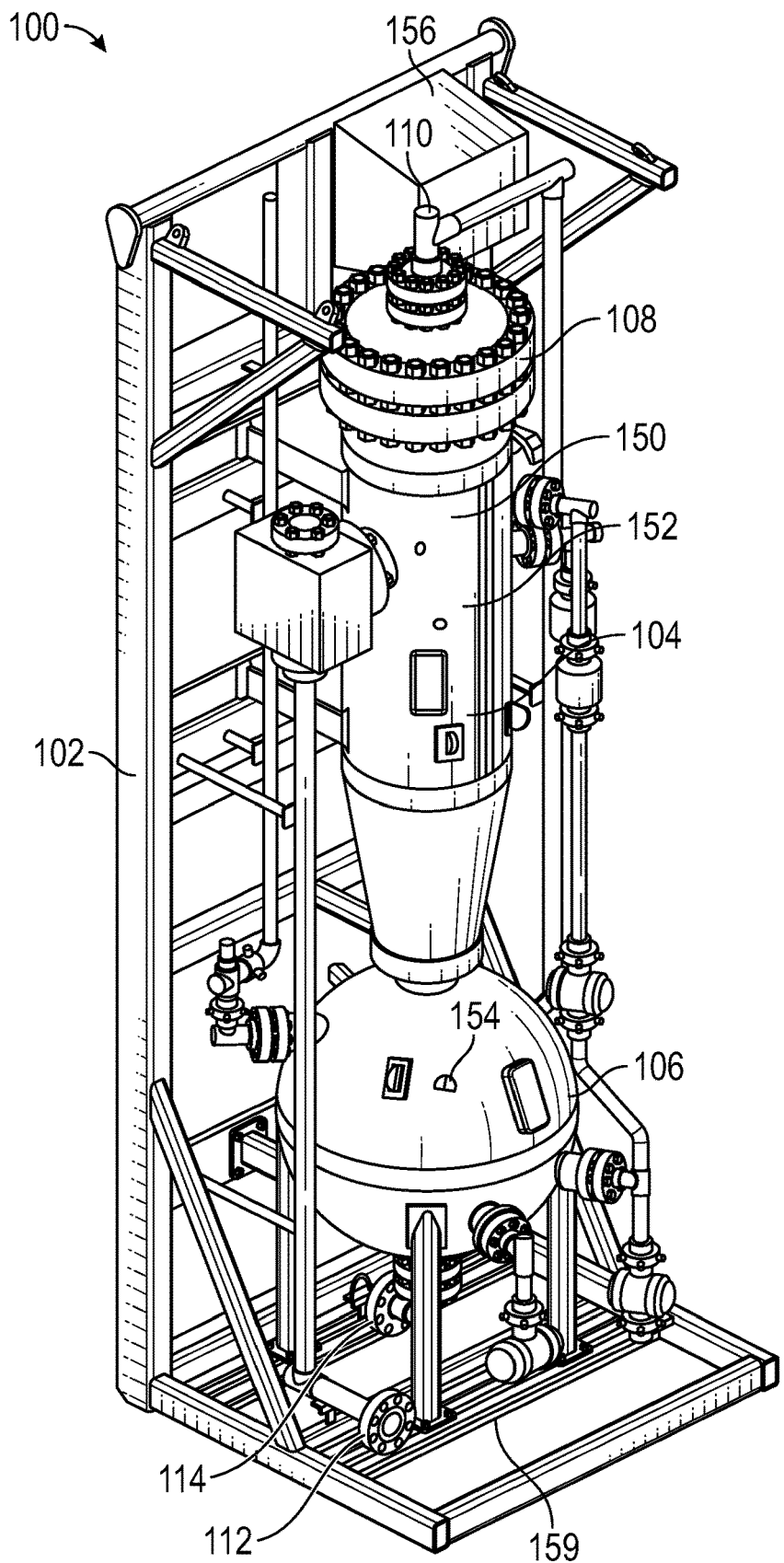
FIG. 1 illustrates a perspective view of one of many embodiments of a well production separation system according to the present inventions.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above, and the written description of specific structures and functions below are not presented to limit the scope of what we have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

We have created a well production separation system that is configured and arranged to efficiently separate solids, such as sand and other particulates, from the liquid and gaseous constituents in the produced fluid. It will be understood that while a solid, such as sand, is not a "fluid," the terms "well fluid" and "produced fluid" are used herein to refer to all matter, regardless of state, that is produced from a well in the attempt to recover hydrocarbons. Embodiments of the well production separation system inventions disclosed herein may comprise a first centrifugal or cyclonic separator configured to discharge particulates in the form of a slurry in a downward direction, and to discharge other liquids and/or gases in an upward direction. Preferably, the first separator is configured with an access port to install a replaceable cyclone module within the first separator. The cyclone module may comprise one cyclonic separator or a plurality of cyclonic separators, as desired based on the flow characteristics of the well and the contents of the well production. The cyclone module is preferably clocked, oriented such that when seated in the first separator, a module inlet aligns with an inlet in the first separator. An inlet sleeve, preferably having an abrasion or erosion resistant coating or surface may be used to communicate well production from an inlet manifold to the cyclone module.

The slurry discharge of the first separator may be coupled to a spherical separator having a swirl inducer at the inlet thereof. The swirl inducer may be configured to induce or promote a swirling or rotating component to the incoming fluid. The swirl inducer is preferably partly domed or spherical in shape such that a collection area for liquids and gases is formed by an underside. A slurry outlet may be provided adjacent the bottom of the spherical separator to discharge the particulates separated from the well production from the system.

Embodiments of the well production separation system also may comprise a pressure equalization circuit communicating from the spherical separator to the liquid/vapor outlet, and/or a liquid/gas recycle circuit. For example, a recycle circuit may allow liquid and gases from the collection area in the spherical separator (e.g., under the swirl inducer) to flow into an area in the first separator above the cyclone module. The recycle circuit also may allow liquid and/or gases from an area in the first separator below the cyclone module to flow into the area in the first separator above the cyclone module. Suitable flow check valves and isolation valves may be incorporated into the recycle circuit as desired.

Embodiments of the well production separation system may be mounted to a frame assembly configured to allow the separation system to be transported to a well site in a horizontal orientation, and then rotated into a vertical orientation for operation.

Embodiments of the well production separation system also may have varying degrees of instrumentation. For example, one or more pressure gages may be installed to show the pressure or differential pressure in various locations in the system. Alternately, one or more electrical or electronic pressure transducers may be installed in various locations in the system. For example, but not limitation, a first pressure transducer may be located in an upper chamber above the cyclone module, and/or a second pressure transducer may be located below the cyclone module, and/or a third pressure transducer may be located in the spherical separator. The signals (outputs) from any of these transducers may be passive or active. Passive in the sense that the transduced value is simply reported or displayed, and active in the sense that the output may be communicated, through wired or wireless links, to a logic controller or computer, and used to control or affect one or more operational aspects of the system or related equipment, such as upstream valving.

In normal operation of the separation systems contemplated herein, there should be a pressure differential across the cyclone module (i.e., above, and below). Flow rate, such as mass flow rate, through the system establishes the pressure differential. This pressure differential may be used to adjust the flow rate into the system to the optimum conditions for the specific system. Further, the pressure differential or absolute pressure of any sensor may be used to control a recycle isolation valve and/or a lower recycle take off valve. Further, a load sensing device, such as a load cell or strain gage, may be operatively associated with the system, such as the spherical separator, and used to control a slurry discharge valve or other such device. Information from the installed sensors may be used to shut down flow into the system in emergency conditions.

Instrumented embodiments of the well production separation system also may comprise a wired or, preferably wireless, communication component that can communicate uni-directionally or bi-directionally with a computer, control system, web site, and/or software application. For example, and not limitation, an instrumented separation system may comprise a cellular wireless communication component that is configured to communicate information, e.g., operational data and/or control instructions, to and from the system and Internet site. A software application loaded on a smart phone, tablet, or laptop, may access the site and information to monitor and/or control the system.

Embodiments of well production separation systems utilizing one or more aspects of the inventions disclosed and taught herein provide benefits and advantages over conventional separation systems in the form of increased particulate separation efficiency, increase separation of liquids and gases, such as hydrocarbons, from particulate slurry, ease of modification for changing well conditions through use of modular components, such as a replaceable cyclone module, and ease of transport and operation.

Turning now to a discussion of selected, non-limiting embodiments of our inventions to illustrate how to make and use the inventions, FIG. 1 illustrates a well production separation system 100 mounted within a frame 102. The system 100 comprises a first centrifugal separator 104 and a second spherical separator 106. The centrifugal separator 104 is disposed above or on top of the spherical separator 106. The centrifugal separator 104 has an access flange 108, preferably at its upper end, which provides both access to the inner components of the centrifugal separator 104 and provides a primary liquid vapor outlet 110. A well production inlet 112 is provided into the centrifugal separator 104. Spherical separator 106 comprises a particulate outlet 114, preferably adjacent the bottom of the separator 106.

Figure 2:
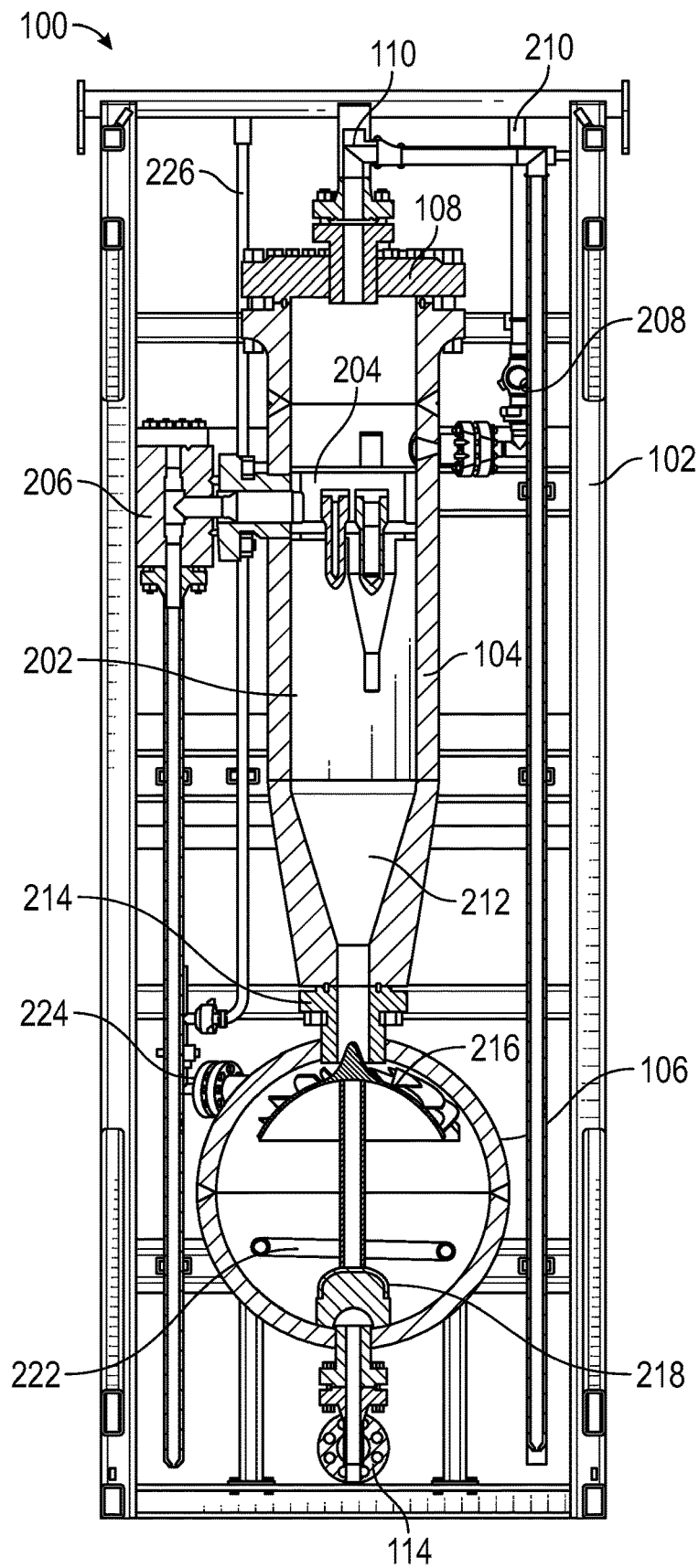
FIG. 2 illustrates a front view cross-section of the system of FIG. 1.

FIG. 2 illustrates a cross-sectional view of the separation system 100 illustrated in FIG. 1. The centrifugal separator 104 is shown to comprise a preferably cylindrical, or cylindrical and conical interior surface 202. An access flange 108 may seal to the top of the separator 104, and preferably comprises the primary liquid/vapor outlet 110. Disposed within the separator 104 is a cyclone module 204 comprising one or more cyclonic separators configured to separate at least particulate matter from liquids and gases. As will be discussed in more detail below, the cyclone module 204 is removably seated in the separator 104 and configured to communicate with an inlet manifold 206. Disposed between the cyclone module 204 and the top of the separator 104 is a pressure relief port that communicates to an upper pressure relief valve 208 and upper pressure relief stack 210.

Below the cyclone module 204, the separator 104 may comprise a conical section 212 in which the separated particulate matter, preferably in the form of a water-based slurry passess as it flows into the spherical separator 106. The spherical separator 106 comprises an inlet flange 214 coupled to the particulate outlet from separator 104. A swirl inducer 216 is disposed within the spherical separator 106, and preferably in a portion of the separator 106 immediately adjacent the inlet. It is preferred that the swirl inducer 216 comprise a partly domed or spherical shape, such as a truncated hemisphere, thereby defining a concave region opposite the inlet. At the bottom of the spherical separator 106, and preferably opposite the inlet, a slurry outlet 114 is provided. Inside the separator 106 and functionally associated with the slurry outlet 114 is a vortex breaker 218 configured to stop the formation of a vortex as the slurry is removed from the separator 106. Preventing formation of a vortex promotes any entrained liquids or gases, such hydrocarbons, to migrate upward and collect in the dome region of the swirl inducer 216. A liquid/vapor conduit 220 may be provided to remove liquids and gases that collect under the swirl inducer 216. The conduit 220 also may provide structural support for the swirl inducer without interfering with the slurry flow within the separator 106. A flush ring 222 also may be provided with the separator 106 and may be configured with multiple outlets generally directed to the slurry outlet 114 to aid in flushing or cleaning the separator 106. The system 100 may comprise a lower pressure relief valve 224 that communicates between a lower pressure relief stack 226 and the separator 106.

It will be appreciated that in operation, the pressure within the area above the cyclone module 204 will be less than the incoming fluid pressure and less than the pressure below the cyclone module 204. This pressure difference may be used to recycle entrained liquids and vapors, such as hydrocarbons, that are discharged from the cyclone module 204 with the particulate slurry.

Figure 3:
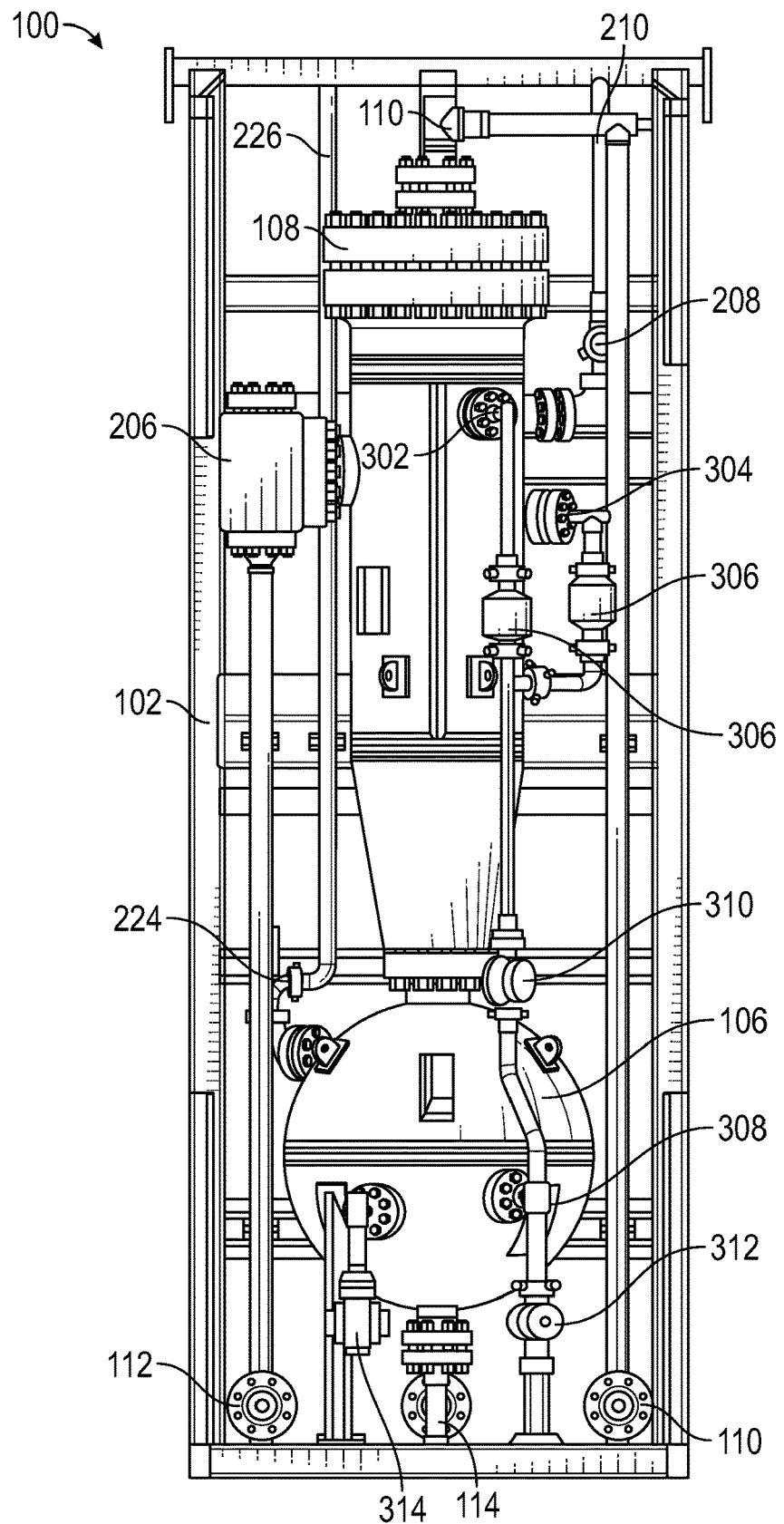
FIG. 3 illustrates a front view of the system illustrated in FIG. 1.
Figure 4:
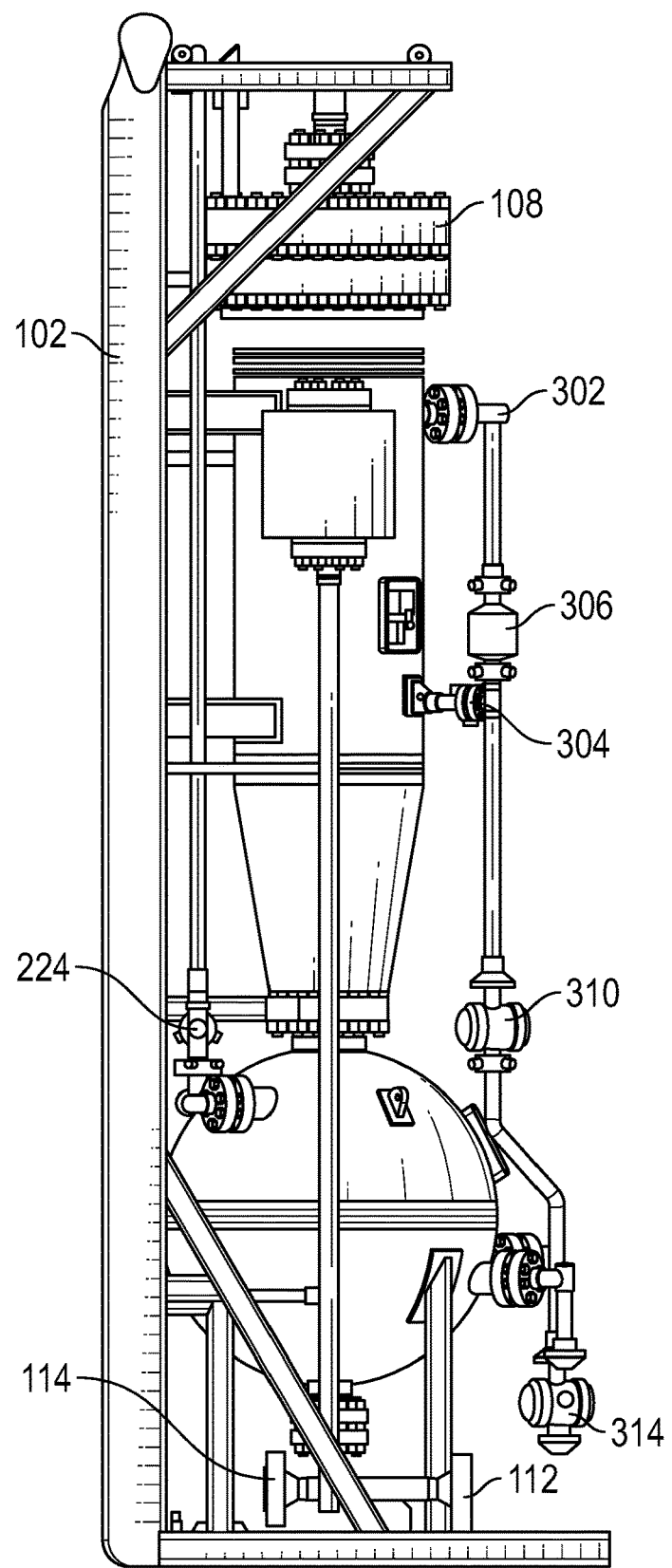
FIG. 4 illustrates a left side view of the system illustrated in FIG. 1.
Figure 5:
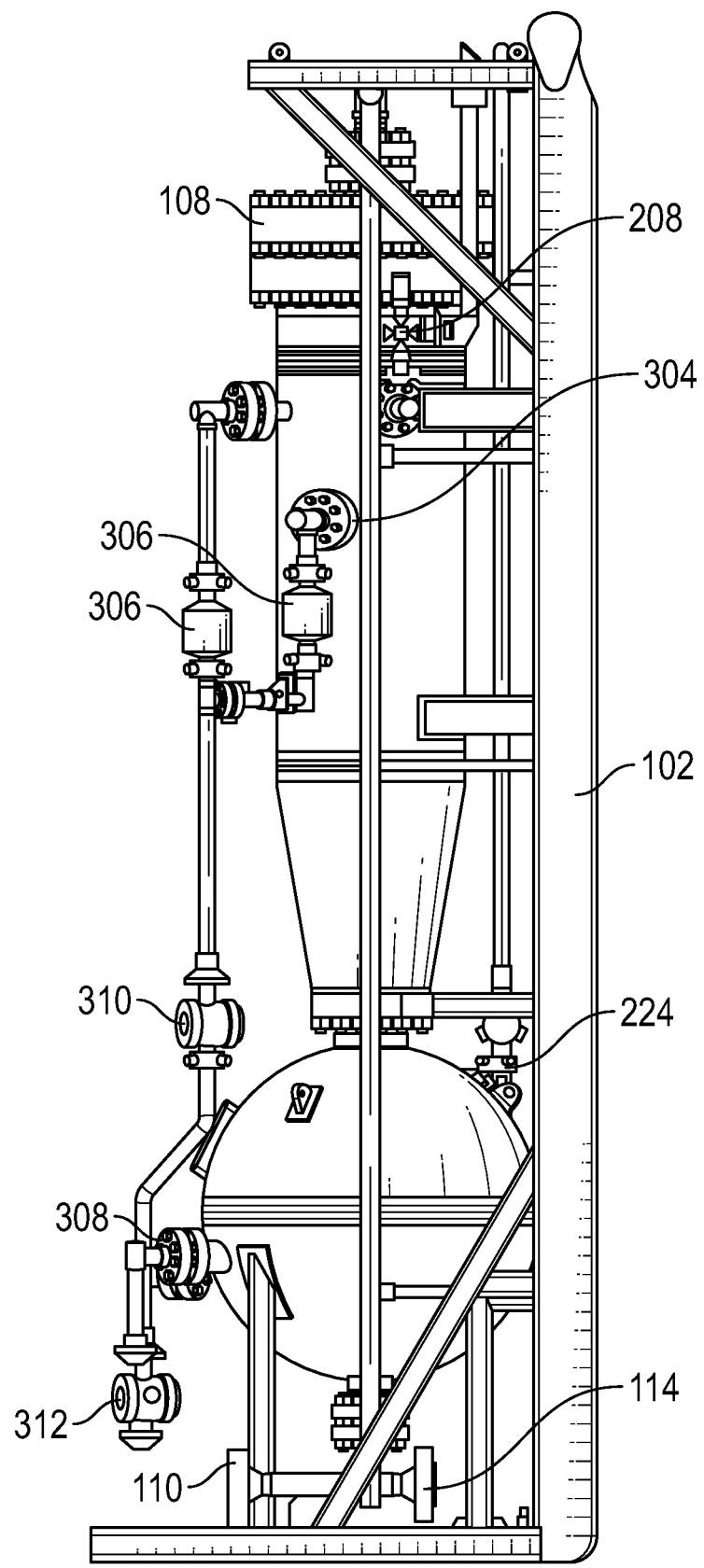
FIG. 5 illustrates a right side view of the system illustrated in FIG. 1.

FIGS. 3, 4, and 5, which are a front view, a right-side view, and a left side view, respectively, of the system 100, show a recycle inlet 302 that communicates with the interior region above the cyclone module 204. Also shown is an intermediate recycle outlet 304 that communicates with the interior region of separator 104 immediately below cyclone module 204. In a first embodiment, the intermediate recycle outlet 304 may be plumbed to the recycle inlet 302, including one or flow direction or check valves 306, so that liquids and/or vapors that collect below the cyclone module 204 can be recycled to the upper region of separator 104 for discharge through outlet 110. In another embodiment, the spherical separator 106 comprises a lower recycle outlet 308 that communicates with the collection region under the swirl inducer 216, preferably through conduit 220. The lower recycle outlet may be plumbed to the recycle inlet 302 so that liquids and/or vapors that collect in the spherical separator 106 may be recycled to the upper region of separator 104 for discharge through outlet 110. It is preferred that lower recycle outlet 308 comprise an isolation valve 310 to selectively block off the lower outlet 308 from the recycle inlet 302. In such embodiments, it is preferred to provide a lower recycle take off valve 312 so that liquids and/or vapors that collect in the spherical separator 106 may be extracted as desired. Also shown is an inlet flush valve 314 plumbed to communicate with the flush ring 222 shown in FIG. 2. It will be appreciated that a fluid, such as brine may be pumped through valve 314 to flush particulate slurry out through the outlet 114.

Figure 6:
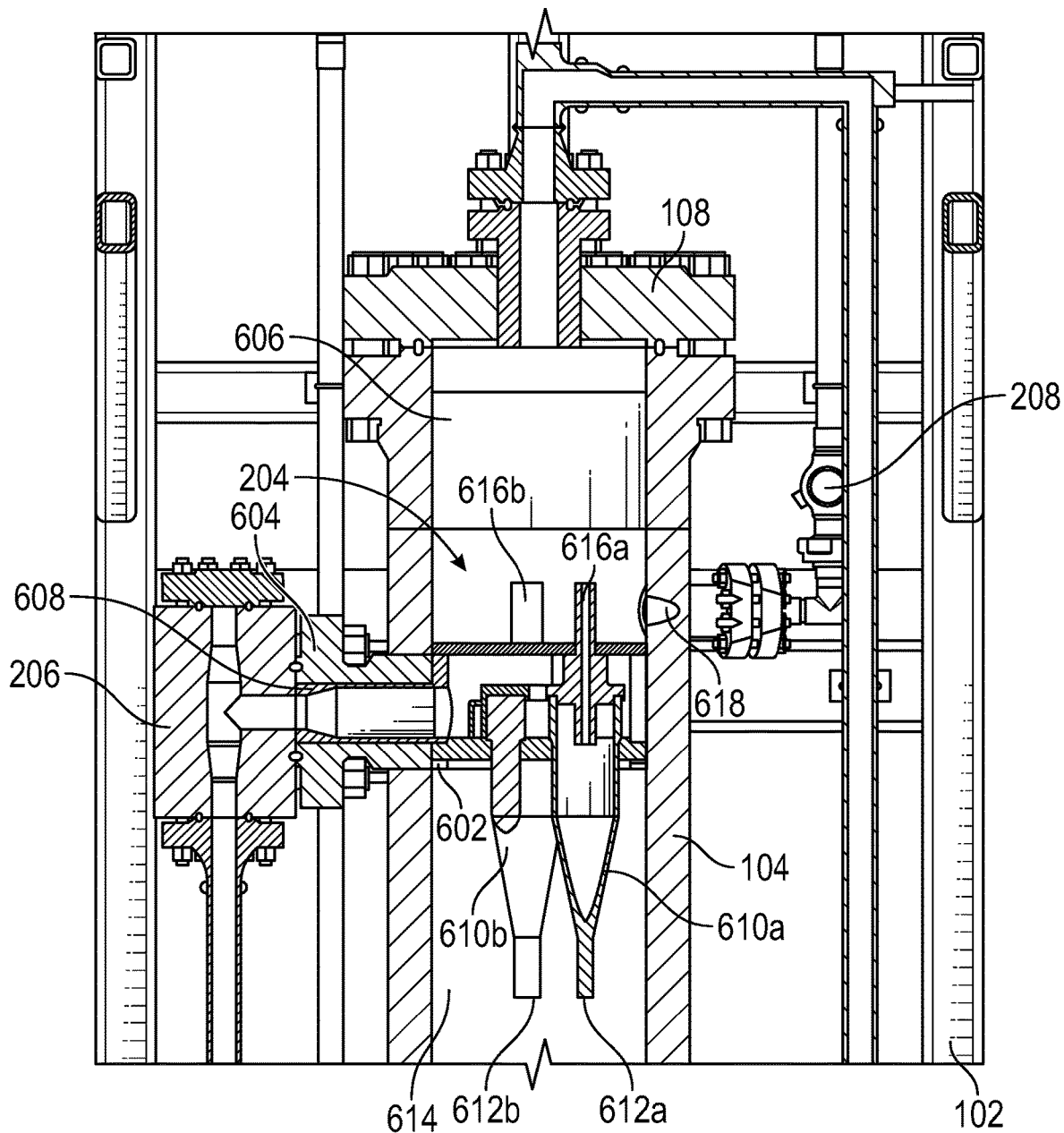
FIG. 6 illustrates a front cross section view of the centrifugal separator illustrated in FIG. 2.

Turning now to FIG. 6, which shows a close-up cross-sectional view of the cyclone module 204 seated in the first separator 104. As discussed, the interior of separator 104 preferably comprises a seat or seats 602 configured to support and orient the cyclone module 204 with respect to the inlet flange 604. It is preferred, but not required, that the module 204 and seat 602 form a seal that prevents migration of particles or fluids across the module 204 and into the upper chamber 606. It is preferred that the module 204 is removably secured into position within the separator 104, such by bolts or other threaded fasteners. The inlet flange 604 preferable comprises a replaceable inlet sleeve 608 configured to extend into and seal with an inlet port on the cyclone module 204. Because of the abrasive nature of the well production entering the system 100, the inlet sleeve 608 and/or cyclone module may be fabricated from abrasion/erosion resistant materials or may have abrasion/erosion resistant coatings. Indeed, all components of a separation subject to abrasion or erosion may be fabricated from abrasion/erosion resistant materials or may have abrasion/erosion resistant coatings. In addition, shown communicating with the upper chamber is upper pressure relief valve 208 through upper pressure port 618.

Figure 7:
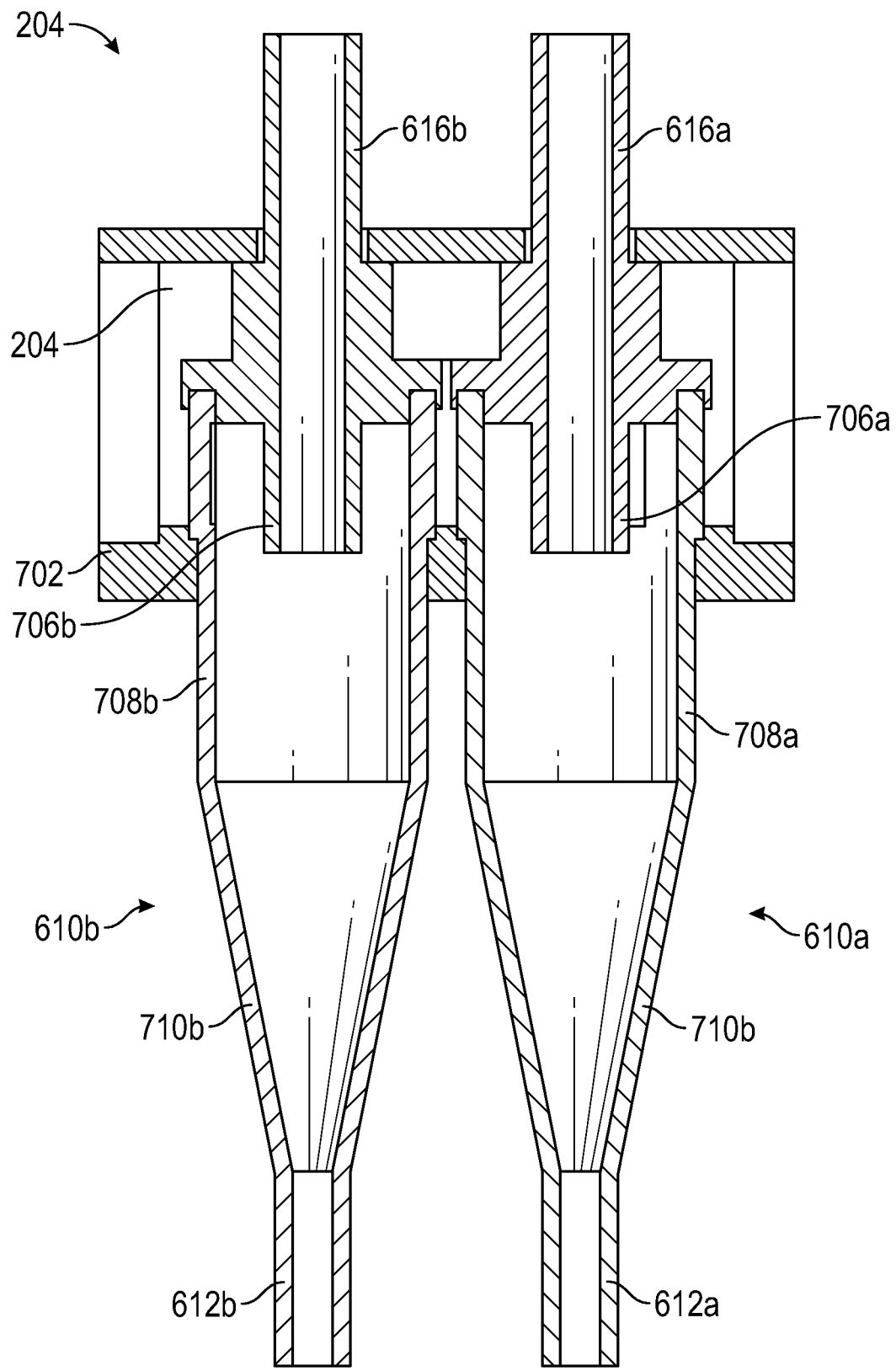
FIG. 7 illustrates a cross-sectional view of an embodiment of a cyclone module suitable for use with the present inventions.

With reference to FIGS. 6 and 7, cyclone module 204 is illustrated to comprise a modular body 702 housing two cyclonic separators 610a and 610b each having a particulate or slurry discharge outlet, or underflow, 612a and 612b communicating with an intermediate chamber 614 below the cyclone module 204. Each cyclonic separator 610a and 610b has a vortex outlet, or overflow, 616a and 616b communicating with the upper chamber 606. The modular body 702 comprises and inlet (not shown) communicating to a plenum 704 defined by the body 702. Each cyclonic separator 610a, 610b has an inlet that communicates with the plenum 704. In other words, well production entering the modular body 702 enters the plenum 704 and then enters each inlet of each cyclonic separator 610a, 610b.

As is known, a high-speed rotating flow is established within the cyclonic separator 610a, 610b. Fluid enters the cyclonic separator adjacent the vortex finder 706a, 706b, and flows in a helical pattern, beginning at the top of the cylindrical section 708a, 708b and ending at the bottom end of the conical section 710a, 710b before exiting the cyclone in a straight stream through the discharge tube 612a, 612b, and out the vortex outlet 616*a*, 616*b*. Heavier (denser) particles in the rotating flow have more inertia than lighter particles or components and contact the inside walls of the cylindrical and/or conical sections and fall to the bottom of the cyclonic separator and out the discharge tube. Because the rotational radius of the flow decreases in the conical section, smaller and smaller particles are separated from the flow. Lighter weight particles and components (such as liquids and gases) create the inner vortex that rises through the vortex finder 706*a*, 706*b* and out the outlet 616*a*, 616*b*. As is known, the cyclone geometry (e.g., size of discharge tube and vortex finder), together with volumetric flow rate, affect the particle separation size.

Referring to back to FIG. 1 and FIG. 6, FIG. 1 illustrates a pressure transducer or sensor 150 located and configured to sense or transduce pressure in the upper chamber 606. Additionally, or alternately, a second pressure transducer or sensor 152 may be located and configured to sense or transduce pressure in the intermediate chamber 614. Additionally, or alternately, a third pressure transducer or sensor 154 may be located and configured to sense or transduce pressure in the spherical separator 106. As discussed above, the output of one or all of these sensors may be displayed passively at the well fluid separator or may be displayed remotely on an Internet site and/or smart device. FIG. 1 also illustrates a logic controller or computer 156 located on the frame 102 and configured to communicate through wired or wireless connection, either uni-directionally or bi-directionally, with one or more of the sensors 150, 152, and/or 154. The controller/computer 156 may be configured, such as through logic circuits and/or software, to receive data from the sensors 150, 152 and/or 154, process the data, and report to a local display and/or an Internet site one or more operating conditions of the system 100. Alternately, the controller/computer 156, may be configured, such as through logic circuits and/or software, to control the state of one or more valves, such as, but not limited to, isolation valve 310. Additionally, controller/computer 156, may be configured, such as through logic circuits and/or software, to adjust the flow rate, such as mass flow rate, of the produced fluid at inlet 206 to maximize the separating efficiency of the cyclone module 204. Additionally, controller/computer 156, may be configured, such as through logic circuits and/or software, to receive commands from an Internet site such as a website, and/or from a wireless smart device to adjust or control operational aspects of the system. For example and not limitation, a command or set of commands may be received by the controller/computer 156, to, for example, adjust the flow rate, such as mass flow rate, of the produced fluid at inlet 206, or to adjust the state of isolation valve 310. The frame 102 also may comprise a load cell or other weight transducing device 159 configured along to determine a weight or other amount of slurry in the spherical separator 106, and to adjust operation of the system 100 accordingly, such as by injecting water or brine to the flush ring 222 through valve 314.

Figure 8:
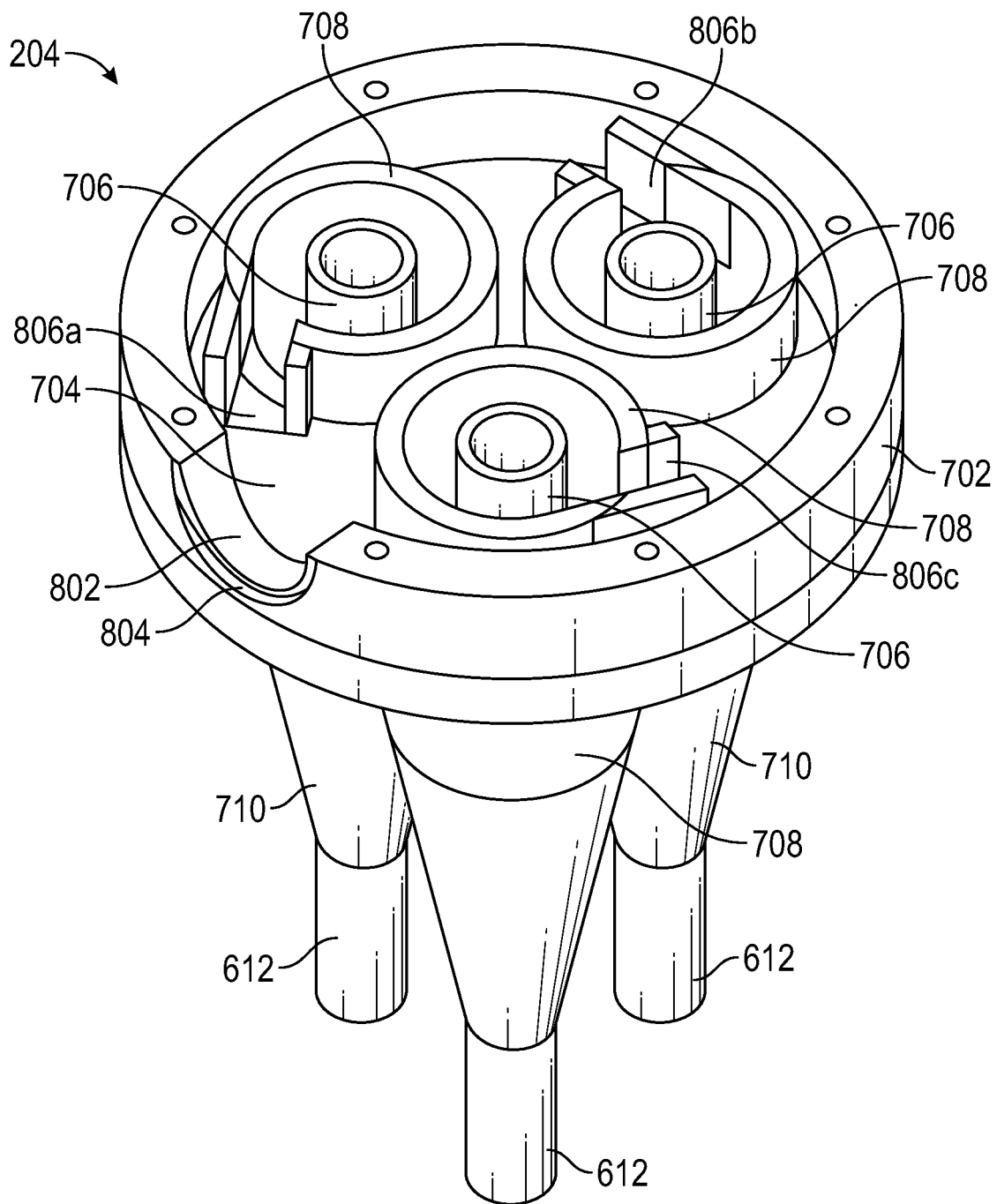
FIG. 8 illustrates another embodiment of a cyclone module suitable for use with the present inventions.
Figure 9:
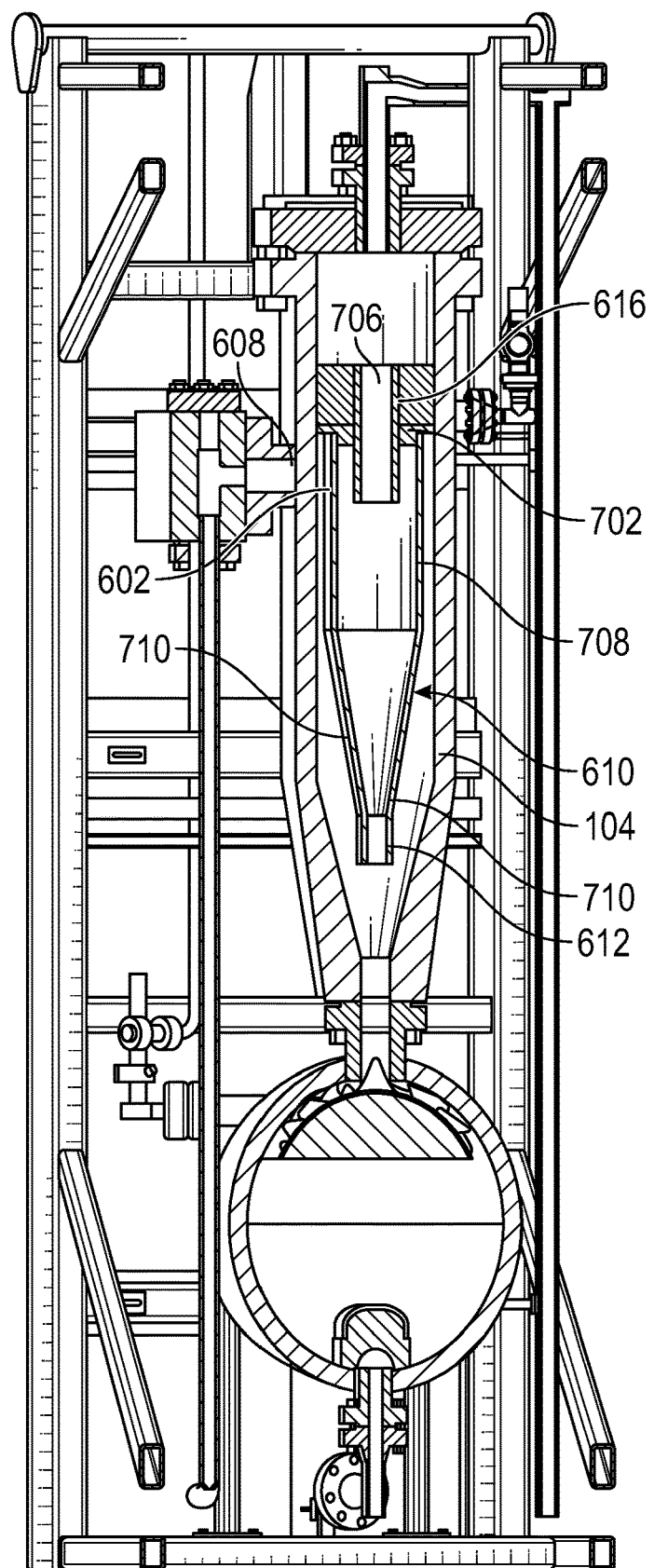
FIG. 9 illustrates another cyclone module suitable for use with the present inventions.

FIG. 8 illustrates another possible embodiment of a cyclone module 204 comprising three cyclonic separators. The top portion of the module body 702 has been removed for illustration purposes. As shown, the body 702 comprises a primary inlet 802 having a sealing surface 804. The inlet 802 communicates with the plenum 704. Each cyclonic separator comprises an inlet 806*a*, 806*b*, and 806*c*. The inlet is positioned on a tangent to the cylindrical section 708 of the cyclonic separator, adjacent the vortex finder 706. FIG. 9 illustrates yet another embodiment of a cyclone module 204 comprising a single cyclonic separator 610.

Figure 10A:
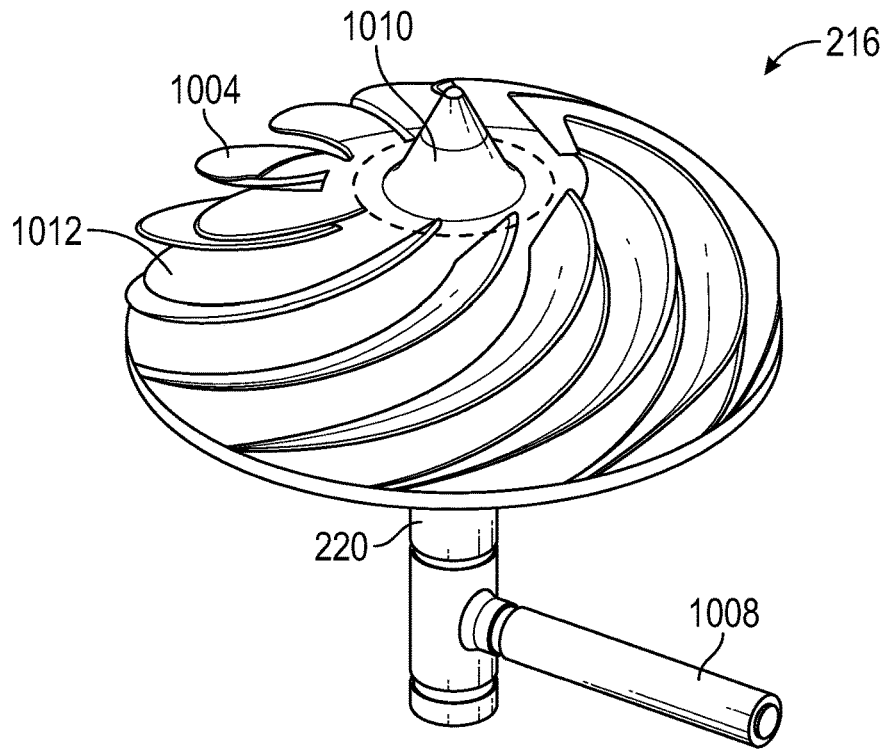
FIGS. 10A and 10B illustrate a swirl inducer suitable for use with the present inventions.
Figure 10B:
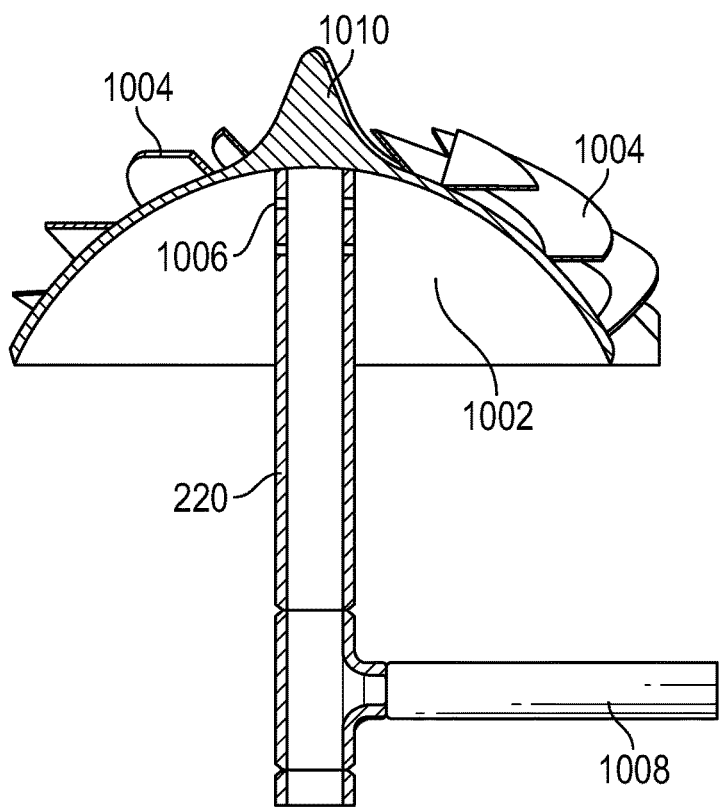

FIGS. 10A and 10B illustrate a swirl inducer 216 suitable for use with embodiments of the present inventions. The inducer 216 preferably comprises a partly spherical shape, such as a truncated hemisphere, thereby defining a collection zone 1002 under the spherical dome. Liquid/vapor conduit 220 may be secured to the underside of the dome, such as by threads or welding, and provide structural support to the inducer 216, such as react forces caused by the impending flow on swirl vanes 1004. Any upper portion of the conduit 220 is perforated to create an inlet 1006 for all liquids and gases that collect in the zone 1002 to enter the conduit 220. The perforations may comprise holes, a strainer, or other such integral or separate device. As shown in FIG. 2, if the conduit 220 is also the support structure for the swirl inducer 216, then a separate outlet pipe 1008 may be used to communicate from the collection zone to a lower recycle outlet 308 (FIG. 3). The swirl inducer 216 also preferably comprises a distribution cone 1010 configured to function with inlet flange 214 (FIG. 2) to evenly distribute material entering the spherical separator 106 about the swirl inducer, and to prevent material build up or blockage.

As shown in FIG. 2, the swirl inducer 216 (and distribution cone 1010) are preferably placed immediately adjacent the inlet to the spherical separator 106, yet spaced apart from the interior walls, forming an annular flow area. It will be appreciated that the size of this flow area preferably should not create a flow restriction (e.g., backpressure) that adversely affects the operation of the cyclone module 204. At the same time, the annular area should not be so large that the swirl vanes 1004 do not adequately impart rotation to the incoming material (e.g., slurry). It is believed that spacing the main surface 1012 of the swirl inducer off the interior surface of the spherical separator 106 by a distance between about 0.5 and 1.5 times the diameter of the inlet in inlet flange 214 provides satisfactory results.

Figure 11:
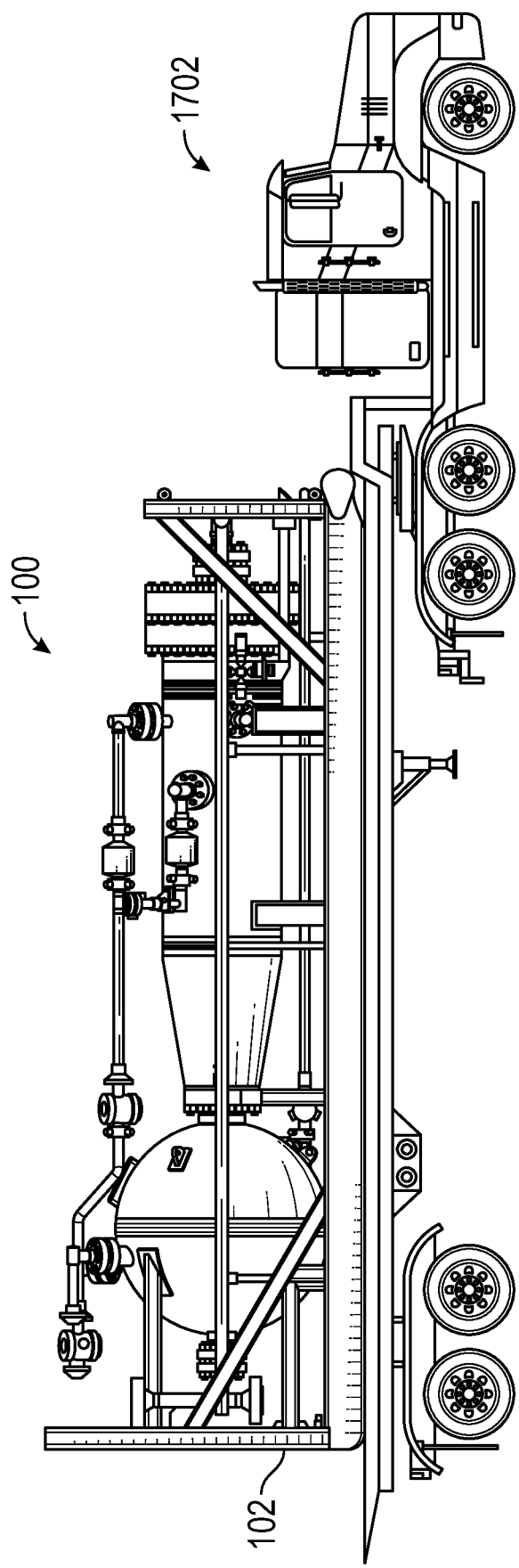
FIG. 11 illustrates the transportability of the present inventions.

FIG. 11 illustrates that well production separation systems practicing one or more of the inventions disclosed herein may be transported horizontally on a trailer to a well site, and then tilted into vertical operation position, such as by hydraulic arms or winching. Loading on the trailer may be accomplished in the same way to allow refurbishing of the system or replacement of parts, such as cyclone module 204.

Figure 12:
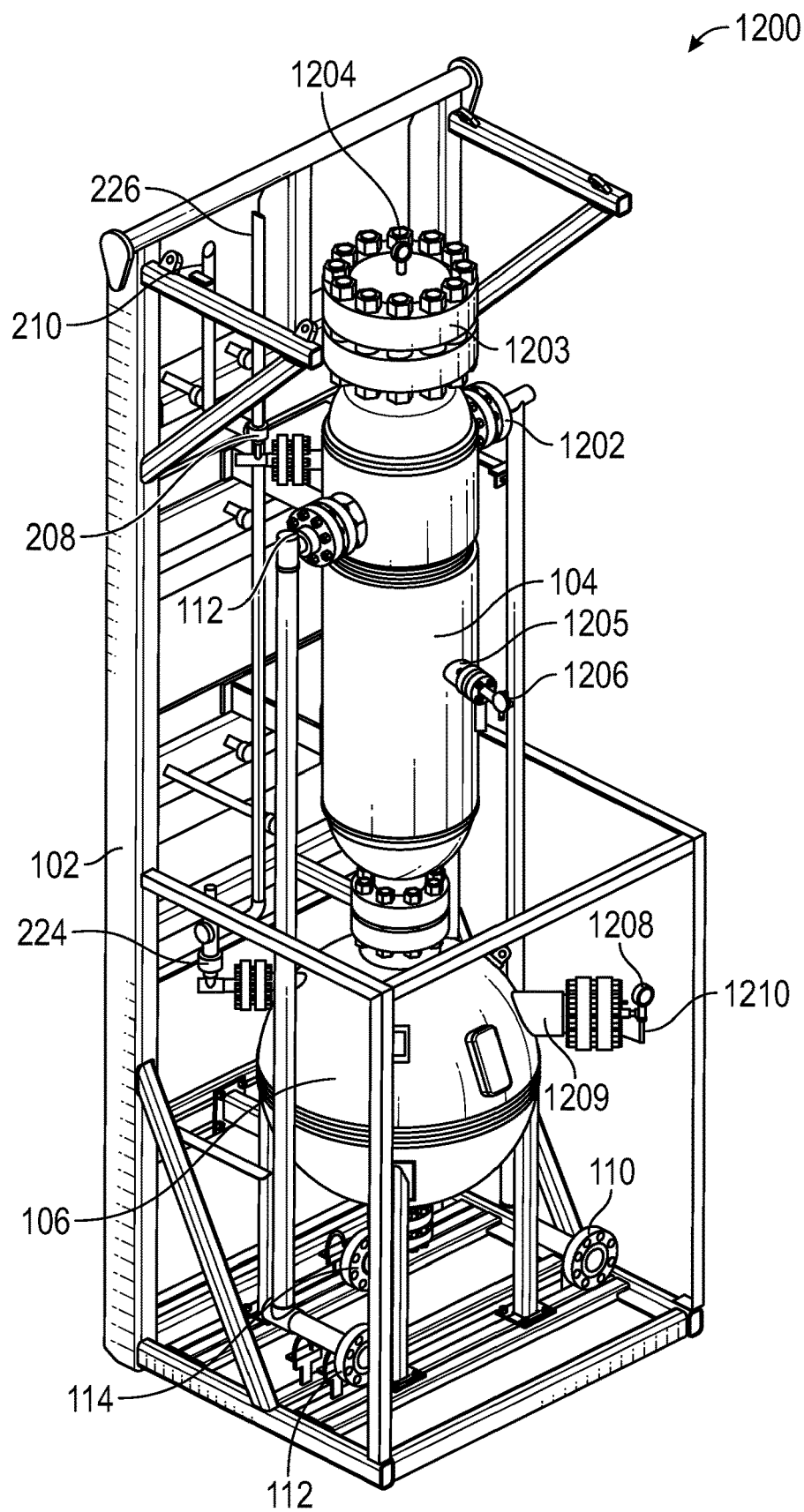
FIG. 12 illustrates a perspective view of another of the many embodiments of a well production separation system according to the present inventions.

FIG. 12 illustrates another embodiment of a well production separation system 1200 mounted on a frame 102, which system 1200 is similar, but not identical, to system 100 discussed previously. The system 1200 comprises a first centrifugal separator 104 and a second spherical separator 106. The centrifugal separator 104 is disposed above or on top of the spherical separator 106. The centrifugal separator 104 has an access flange 1203, preferably at its upper end, which has a lifting eye 1204 and which provides access to the inner components of the centrifugal separator 104. A well production inlet 112 is provided into the centrifugal separator 104, preferably adjacent the ground. Spherical separator 106 comprises a particulate outlet 114, preferably adjacent the bottom of the separator 106.

System 1200 comprises a liquid/vapor outlet 1202 located below the flange 1203 and communicating into the body of the centrifugal separator 104. The centrifugal separator 104 may have a pressure tap 1205 communicating the with the interior of the separator 104 below the cyclone (refer to FIG. 13) and configured to support a manual (e.g., dial) pressure gage or an electrical or electronic pressure transducer 1206. Similarly, the spherical separator 106 may have a pressure tap 1209 configured to communicate the with the interior of the separator 106 and to support a manual (e.g., dial) pressure gage or an electrical or electronic pressure transducer 1208. The pressure tap 1209 also may be configured to support a pressure equalization line 1210 that communicates from the interior of the spherical separator 106 to the liquid vapor outlet line 110.

Figure 13:
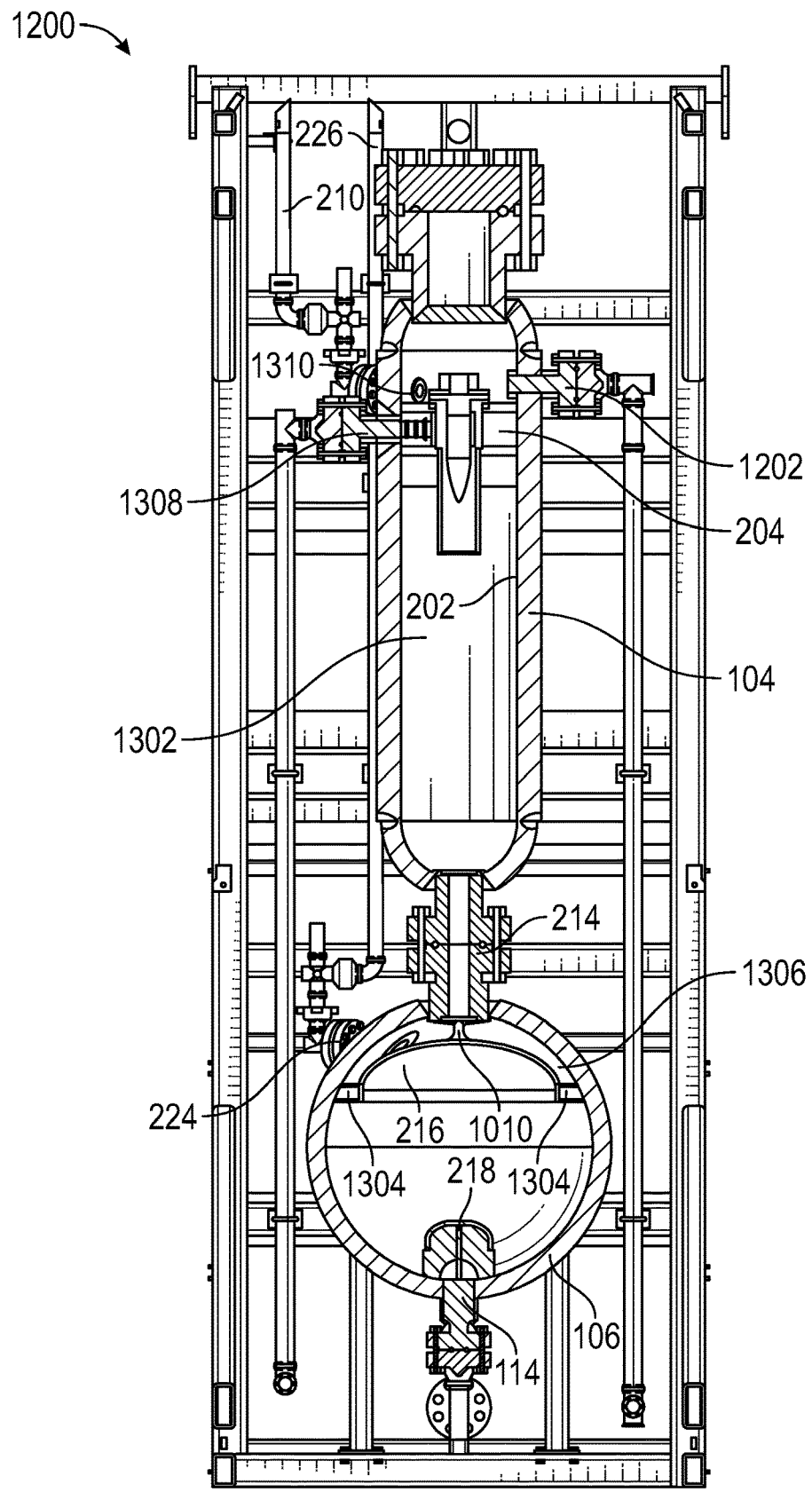
FIG. 13 illustrates a front view cross-section of the system of FIG. 12.

FIG. 13 illustrates a cross-sectional view of the separation system 1200 illustrated in FIG. 12. Disposed within the separator 104 is a cyclone module 204 comprising one or more cyclonic separators configured to separate at least particulate matter from liquids and gases. As discussed above, the cyclone module 204 may be removably seated in the separator 104 and configured to communicate with an inlet 1308. Disposed between the cyclone module 204 and the top of the separator 104 is a pressure relief port 1310 that communicates to an upper pressure relief valve 208 and upper pressure relief stack 210.

Below the cyclone module 204, the separator 104 may comprise a region 1302 in which the particulate matter separated by the cyclone module, preferably in the form of a water-based slurry, passes as it flows into the spherical separator 106. The spherical separator 106 comprises an inlet flange 214 coupled to the particulate outlet from separator 104. A swirl inducer 216 may be disposed within the spherical separator 106, and preferably in a portion of the separator 106 immediately adjacent and below the inlet. It is preferred that the swirl inducer 216 comprise a partly spherical or otherwise rounded shape, such as, but not limited to, a dome, thereby defining a region under the dome. At the bottom of the spherical separator 106, and preferably opposite the inlet, a slurry outlet 114 is provided. Inside the separator 106 and functionally associated with the slurry outlet 114 is a vortex breaker 218 configured to stop the formation of a vortex as the slurry is removed from or flows out of the separator 106. Preventing formation of a vortex promotes migration of any entrained liquids or gases, such as hydrocarbons, upward and to collect in the dome region of the swirl inducer 216. Although not shown in FIG. 13, a liquid/vapor conduit may be provided to remove liquids and gases that collect under the swirl inducer 216. The conduit also may provide structural support for the swirl inducer without interfering with the slurry flow within the separator 106. Alternately, and as shown in FIG. 13, swirl inducing vanes or blades (discussed below) also may provide structural support for the swirl inducer 216. The system 1200 also may comprise a lower pressure relief valve 224 that communicates between a lower pressure relief stack 226 and the separator 106.

Figure 14:
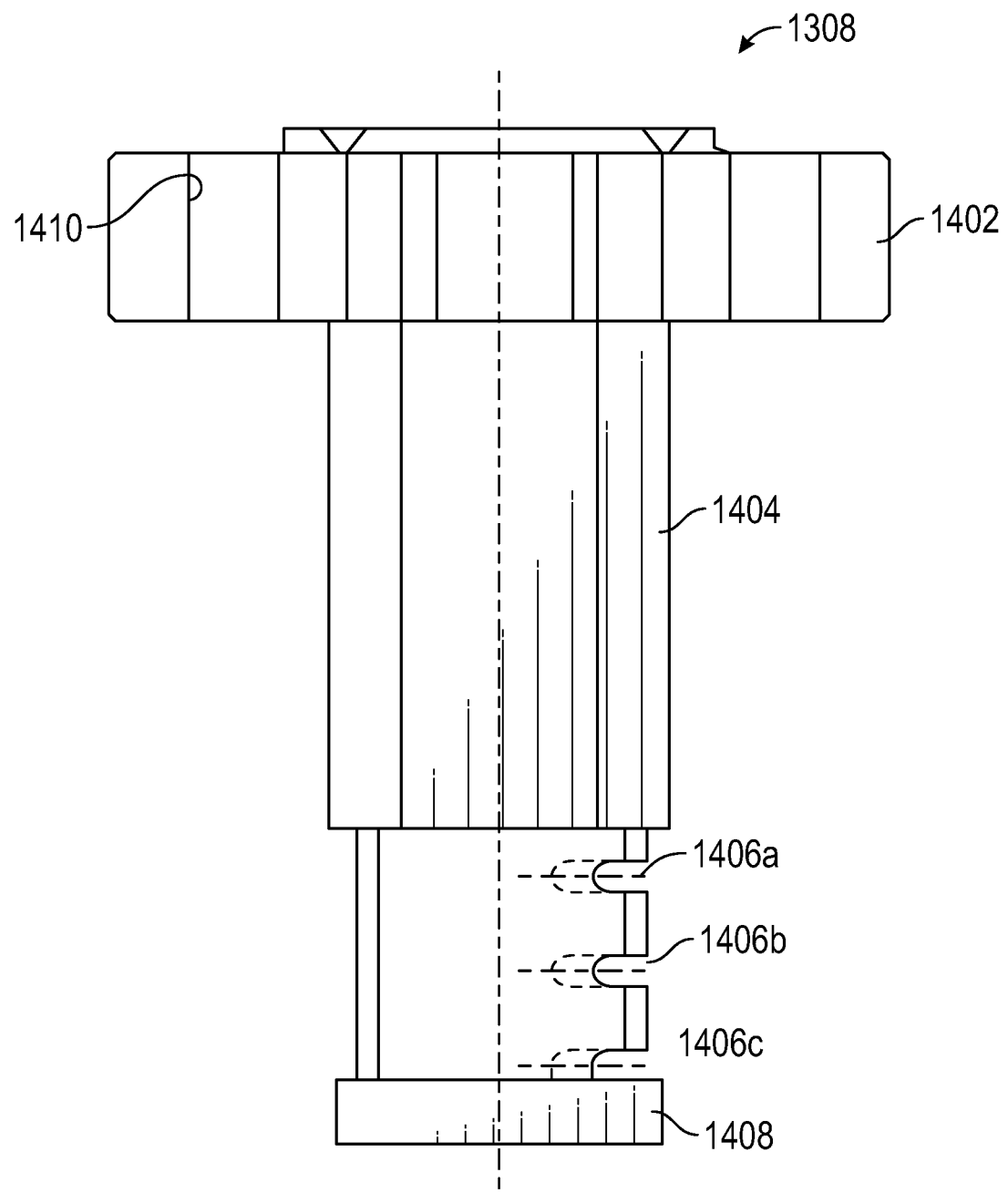
FIG. 14 illustrates a cross-sectional view of a replaceable fluid inlet useful with embodiments utilizing the present inventions.

FIG. 14 illustrates a form of centrifugal separator inlet flange 1308 that may be used with the embodiments previously discussed and with other separation system embodiments. Inlet flange 1308 comprises a mounting flange 1402 having one or more fastener holes 1410 and an axial flow channel that terminates in a blocking plate 1408. Fluid exits the inlet flange through a plurality of ports 1406a, 1406b, 1406c formed in the body 1404 of the inlet flange 1308. The ports 1406 preferably are sized based on the expected particulate size of the fluid and/or based on the flow openings in the cyclone module. More specifically, the ports 1406 can be sized to pass particulates having a size that will not block, occlude, or otherwise foul the cyclone module. If particulates larger than the ports 1406 become lodged or caught in the axial flow channel of the inlet flange (because the particulates cannot pass through the ports 1406), a pressure drop in the separation system will result, indicating the need to remove the trapped particulates. It is preferred that the inlet flange 1308 be readily removable from the separation system for cleaning, maintenance, or replacement. While the ports 1406 illustrated in FIG. 14 are oriented normal (e.g., radially) to the axial flow channel, it will be appreciated that the ports also may be located in plate 1408 or elsewhere on body 1404.

Figure 15:
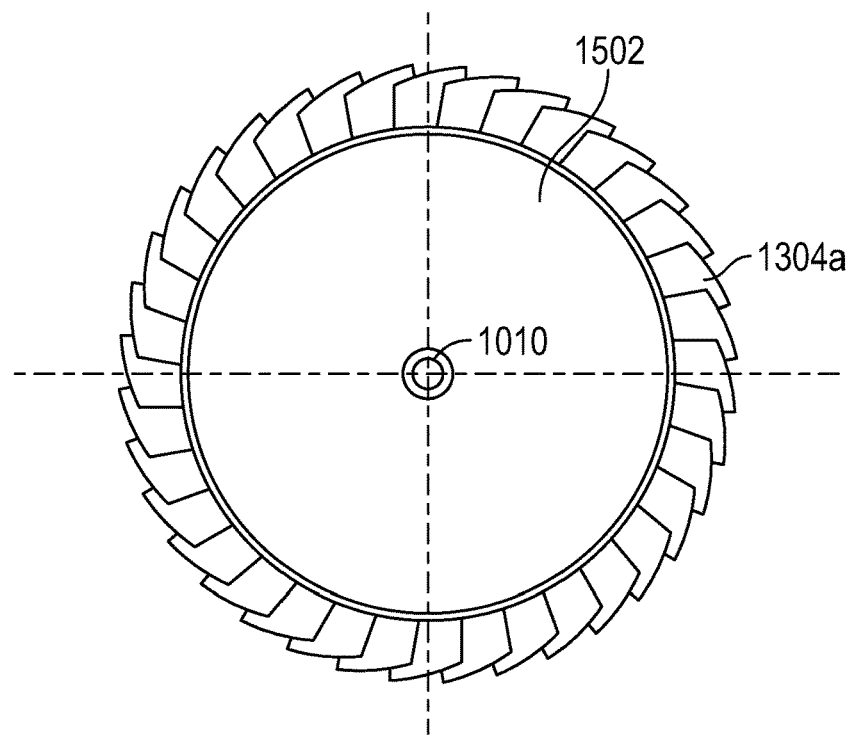
FIG. 15 illustrates a top side view of a swirl inducer useful with embodiments utilizing the present inventions.
Figure 16A:
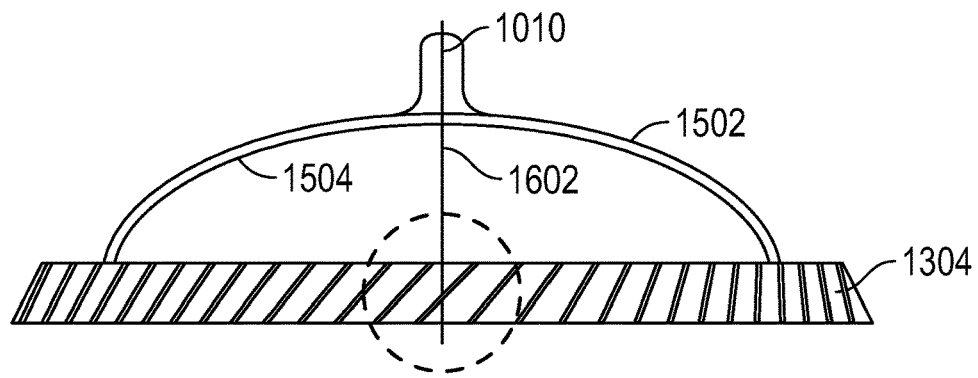
FIGS. 16A and 16B illustrate details of the swirl inducer shown in FIG. 15.
Figure 16B:
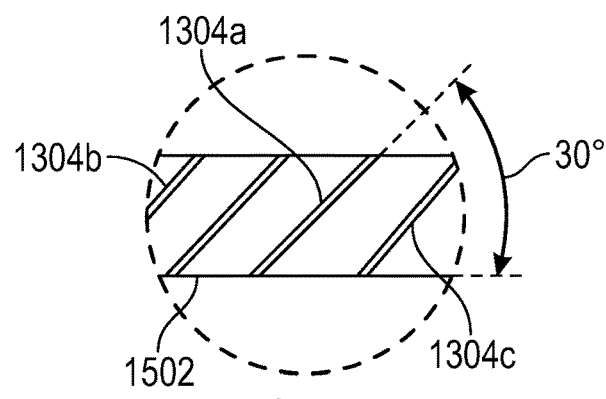

FIGS. 15, 16A and 16B illustrate an alternate form of a swirl inducer 216 useful with any of the embodiments discussed above. As shown in FIG. 15 fins or vanes 1304 may be disposed on a periphery of the body of the swirl inducer. As illustrated in FIG. is 13, these vanes 1304 may provide structural support and placement of the swirl inducer within the spherical separator 106. For example, vanes 1304 may be welded to the inducer body and to the inner surface of the spherical separator 106. As illustrated in FIGS. 16A and 16B, the vanes 1304 may be oriented at an angle to the inlet centerline 1602, such as 60°, and preferably between 40° and 80° to the axial inlet axis (50° to 10° to a plane normal to the inlet flow axis). It will be appreciated that as the particulate slurry exits the centrifugal separator 104 and enters the spherical separator 106, and is distributed by the inlet cone 1010, flows along the outer surface 1502 in the annular region 1306 between the inducer 216 and the spherical separator interior wall. As discussed above, the annular region is sized to be large enough not to create backpressure that diminishes the performance of the cyclone module, and yet small enough to maximize the dissipation of flow energy by converting axial flow into circumferential flow. As discussed above, reducing the kinetic energy of the flowing slurry promotes dis-entrainment of particles, such as sand, from the slurry. Although FIG. 16A illustrates that the vanes 1304 have a height that is a fraction of the height of the inducer, the vane height may also be ⅓, ½ or even ⅔ of the inducer height.

Figure 17:
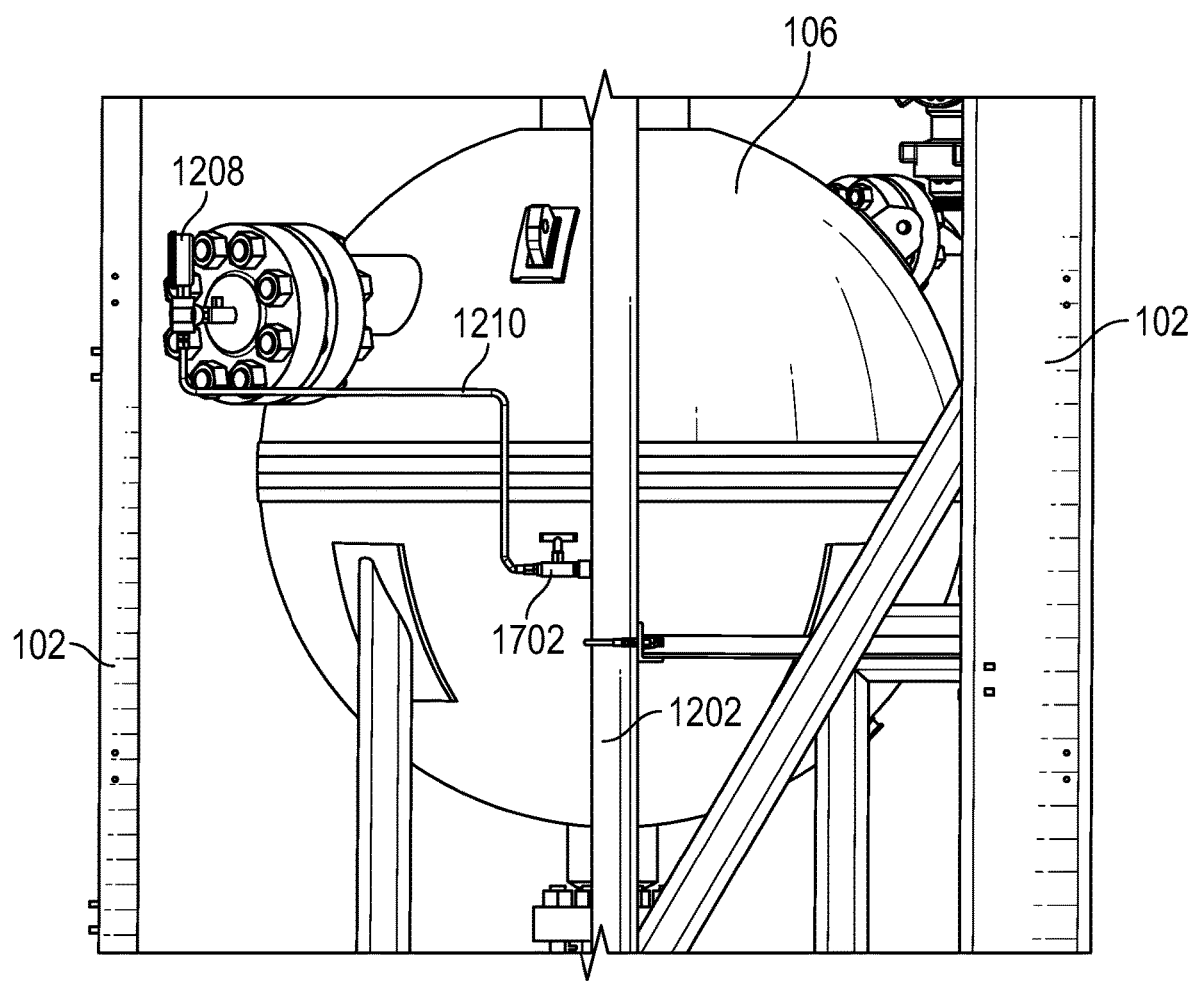
FIG. 17 illustrates a spherical separator useful with embodiments utilizing the present inventions.

As can be seen in FIG. 12, the embodiment illustrated as system 1200 does not utilize the recycle lines discussed with respect to system 100. Instead, system 1200 utilizes a pressure equalization system comprising an equalization line 1210, which may be, for example, a ½ inch conduit, that communicates from the interior of the spherical separator 106 to a region above the cyclone module 204. The equalization system preferably comprises a pressure transducer 1208, such as a dial gage, and a metering valve 1702 or other type of adjustable orifice that is configured to adjust the flow or pressure equalization between the spherical separator and the centrifugal separator. As shown in FIG. 17, the metering valve 1702 may be connected to the liquid/vapor outlet line 1202. In practice, it has been found that separation systems operate effectively with a pressure differential (between above the cyclone module and the spherical separator) of between about 20 to 80 psig, and most preferably between about 40 to 50 psig. Valve 1702 can be adjusted to adjust this differential pressure to a desired value or range. Valve 1702 also may comprise a pressure regulator that automatically adjusts the differential pressure to the desire value or range. In an instrumented embodiment, valve 1702 may be a controllable valve.

Having the benefit of this disclosure, it now will be appreciated that the various components of the separation systems discussed above and shown in the figures can be mixed and matched as desired to form separation systems having one or more of the attributes or functions discussed herein. Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed:

1. A well production separation system, comprising:
   a first separating vessel disposed above a second separating vessel;
   the first separating vessel having a well production inlet, a removable cyclone module, an upper outlet, and a lower outlet coupled to the second separating vessel;
   the removable cyclone module comprising at least one cyclonic separator configured to separate at least a portion of particulate matter from the well production and discharge such particulate matter through the lower outlet, and to separate at least a portion of liquid and gas fluid in the well production and discharge such fluid from the upper outlet;
   the second separating vessel comprising a spherical inner surface with an inlet disposed on a top portion of the vessel, and an outlet disposed on a bottom portion of the vessel;
   a swirl inducer having an outer convex surface and an inner concave surface, and disposed within the second vessel below the inlet and comprising rotation inducing vanes on the outer surface configured to induce rotation of the well production that impacts the outer surface, the inner convex surface configure to collect liquid and/or gas within the second vessel; and
   a fluid conduit configured to communicate from the second vessel to the upper outlet in the first vessel.

2. The system of claim 1, further comprising a first chamber located in the first separating vessel above the cyclone module and below the upper outlet.

3. The system of claim 1, further comprising a first pressure sensor configured to transduce pressure in the first separating vessel.

4. The system of claim 2, further comprising a second chamber located in the first separating vessel below the cyclone module.

5. The system of claim 1, further comprising a first pressure sensor configured to transduce pressure in the first separating vessel, and a second pressure sensor configured to transduce pressure in the second separating vessel.

6. The system of claim 1, further comprising a differential pressure sensor configured to transduce differential pressure between the first and second separating vessels.

7. The system of claim 1, wherein the fluid conduit is comprises an adjustable orifice configured to adjust a pressure differential between the first and second separating vessels.

8. The system of claim 7, further comprising at least one metering valve in the fluid conduit.

9. The system of claim 1, wherein the fluid conduit is a pressure equalization conduit.

10. A method using the system of claim 1 of separating production from a subterranean well into one or more components, comprising:
    introducing production into the first separating vessel;
    extracting fluid separated from the production by the removable cyclone module through the upper outlet;
    discharging production components separated by the removable cyclone module into the second separating vessel;
    contacting the swirl inducer with the production components to induce rotation in the production components; and
    discharging a slurry containing particulates from the production components from the second separating vessel.

11. The method of claim 10, further comprising sensing a pressure in a chamber in the first vessel above the removable cyclone module.

12. The method of claim 11, further comprising sensing pressure in the first separating vessel below the cyclone module.

13. The method of claim 12, further comprising sensing pressure in the second separating vessel.

14. The method of claim 10, further comprising restricting flow of fluid to a direction into the first separating vessel above the cyclone module, but not out of the first separating vessel above the cyclone module.

15. The method of claim 14, further comprising preventing flow of fluid from the second separating vessel to the first vessel above the removable cyclone module.

16. The method of claim 15, further comprising extracting fluid from the second separating vessel when flow of fluid from the second separating vessel to the first separating vessel above the removable cyclone module is prevented.

17. The method of claim 10 further comprising determining an amount of slurry in the second separating vessel.

18. The system of claim 1, wherein the fluid conduit comprises an adjustable orifice configured to maintain a differential pressure between the first and second vessels of between about 20 and 80 psi.

19. The system of claim 1, wherein the well production inlet is removable and is configured to allow particulate matter smaller than a predetermined size to pass therethrough.

20. The system of claim 1, further comprising a first dial pressure gage in operative communication with the first vessel, a second dial pressure gage in operative communication with the second vessel, and a metering valve disposed in the fluid conduit and configured to adjust a differential pressure between the first and second vessels.

* * * * *